UNITED STATES PATENT OFFICE.

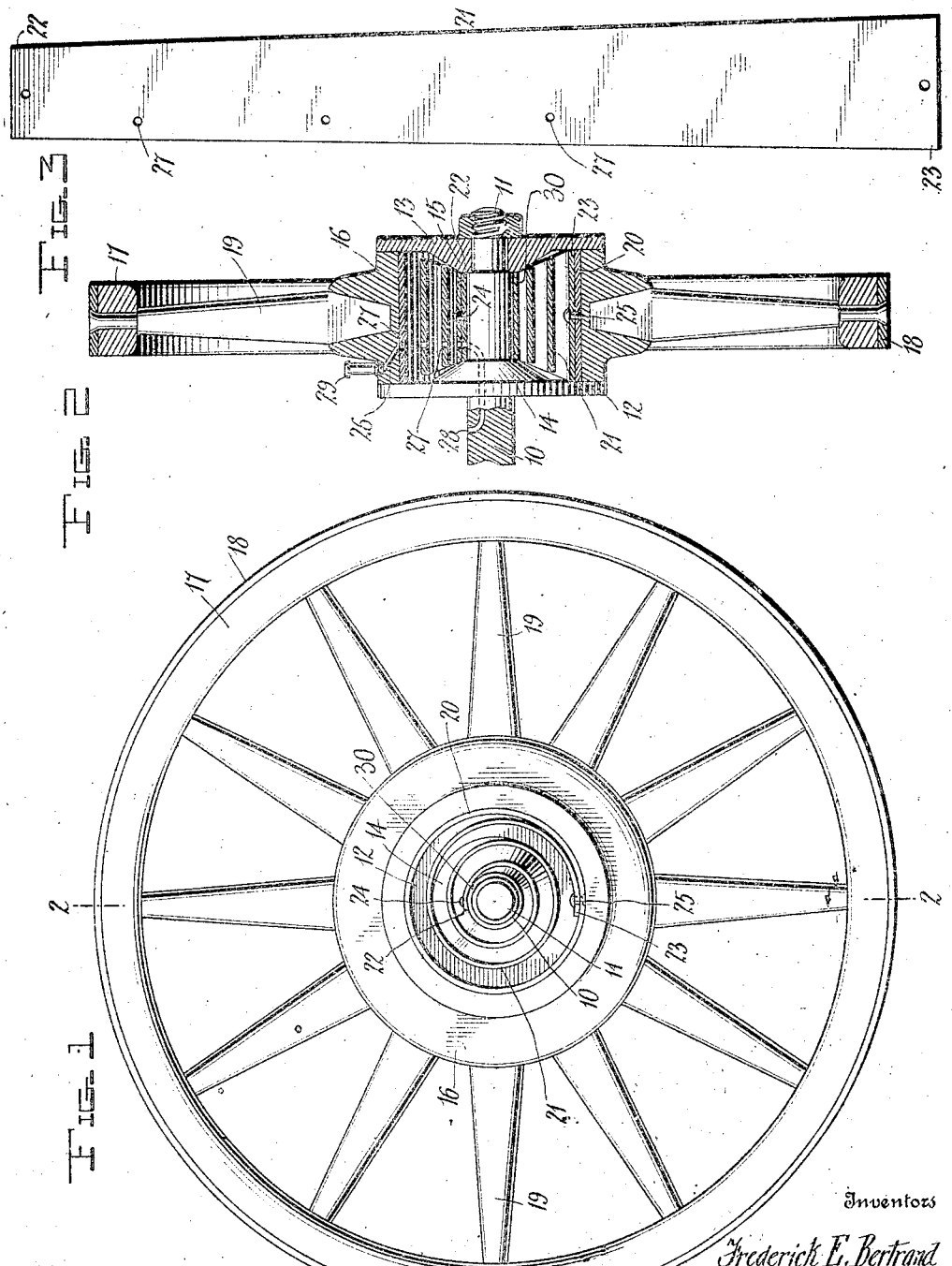

FREDERICK E. BERTRAND AND GEORGE PORTSCHE, OF LINCOLN, NEBRASKA.

WHEEL.

941,753.

Specification of Letters Patent.  Patented Nov. 30, 1909.

Application filed October 19, 1908. Serial No. 458,535.

*To all whom it may concern:*

Be it known that we, FREDERICK E. BERTRAND and GEORGE PORTSCHE, citizens of the United States, residing at Lincoln, in the county of Lancaster, State of Nebraska, have invented certain new and useful Improvements in Wheels; and we do hereby declare the following to be a full, clear, and exact description of the invention, such as will enable others skilled in the art to which it appertains to make and use the same.

This invention relates to improvements in wheels, more particularly to wheels having resilient or yielding properties and adapted more particularly for use in connection with automobiles and like vehicles, but which may also be employed upon vehicles of various kinds, and has for one of its objects to simplify and improve the construction and increase the efficiency, durability and utility of devices of this character.

Another object of the invention is to provide a yieldable wheel which may be applied with equal facility to the heaviest or lightest vehicles, and without structural changes in the vehicles.

With these and other objects in view, the invention consists generally in an axle having spaced collars, a wheel having a hollow hub arranged between the collars, and a coiled spring within the hub of the wheel and connected at one end to the hub and at the other end to the axle.

The invention further consists in an axle with spaced disks at the ends having inwardly directed conical projections, a wheel having a hollow hub located between the disks, and a coiled spring formed from a converging strip whereby the inner whirl of the spring is the smallest and attached to the axle between the conical projections, and the larger outer whirl of the spring connected to the interior of the hub.

The invention further consists in certain novel features of construction as hereafter shown and described and then specifically pointed out in the claim, and in the drawings illustrative of the preferred embodiment of the invention, Figure 1 is a side elevation of one of the improved wheels with the detachable disk removed. Fig. 2 is a sectional view on the line 2—2 of Fig. 1. Fig. 3 is a view of the spring plate before it is bent into the coil.

The improved device comprises an axle 10 having a threaded outer end 11. Formed upon the axle and spaced from the threaded end is a disk 12, and bearing upon the outer end of the axle next to the threaded end is another similar disk 13, the confronting faces of the disks formed with inwardly directed conical projections 14—15, the disks being spaced apart a distance equal to the thickness of the hub of the wheel. The wheel comprises a hollow hub 16, a rim or felly 17, a tire 18 and spokes 19, the tire, felly and spokes being of the usual form. The hub 16 extends between the disks 12—13, and is about equal in diameter to the disks, as shown. The hub 16 is lined with a metal cylindrical member 20, which is preferably rigidly connected thereto in any suitable manner.

Disposed within the hub 16 and between the cylindrical lining member 20 and the axle 10 is a coiled spring, formed from a strip of steel having converging sides so that when bent into a coil, the inner whirl will be the smallest and will equal the distance between the conical projections 14—15, while the outer whirl will equal in width the thickness of the hub or the length of the cylindrical lining member 20. The plate from which the spring is formed, is shown in Fig. 3, and represented as a whole by the character 21 with the smaller end 22 fastened by a rivet 24 or other fastening devices to a sleeve 30 surrounding the axle 10, and with the larger outer end 23 riveted or otherwise secured at 25 to the cylindrical lining member 20. By this simple means the "load" of the vehicle is borne by the spring members 21, so that all jars and concussions are absorbed by the spring members and not communicated to the body of the vehicle or the load carried thereby. The presence of the springs also lessens the risk of injury to the wheels, as the springs within the hubs yield to the impact of any obstruction met by the wheels, and thus materially lessens the strain upon the wheel.

The length of the plate upon which the spring is constructed may be varied as required to increase or decrease the number of the whirls of the spring, and the gage of the plate may be likewise varied to increase or decrease the strength and resistance of the spring, to adapt it to the size of the vehicle on which it is to be employed.

An oil cup 29 is attached to the hub 16 and leads by its discharge 29 through the lining member 20, so that lubricating material may be supplied to the spring, to prevent oxidation.

The various whirls of the spring will be provided with small registering apertures 27 opposite the discharge of the oil cup, so that the oil will freely flow to the axle.

The conical projections 14—15 serve an important function, as they effectually support the whirls of the spring when the latter are fully compressed or condensed, and thus effectually prevent looseness or movement between the wheels and the axle, as the various whirls of the spring receive the endwise thrust and absorb it so that it is not communicated to the axle through the impact of the hub members with the disks 12—13. This is an important feature of the invention and adds materially to its novelty and efficiency.

The cost of construction of the improved wheel is not increased materially and the improvement may be applied, as above noted, to wheels of various sizes, and to wheels yieldable upon vehicles of various forms.

What is claimed, is:—

In a device of the class described, a wheel comprising a hollow hub, a rim, and a plurality of connecting spokes, spaced disks between which said hub is located, each of said disks having an inwardly directed annular conical projection, an axle extending through said disks, a sleeve surrounding said axle between said disks, and a coiled spring smallest at the inner whirl and connected by said smaller inner whirl to the sleeve between the conical projections and by the outer whirls to the hub, and against whose edges said conical projections bear.

In testimony whereof, we affix our signatures in presence of two witnesses.

FREDERICK E. BERTRAND.
GEORGE PORTSCHE.

Witnesses:
L. C. SEXTON,
HARRY E. REED.